United States Patent
Brown et al.

(10) Patent No.: US 6,826,623 B1
(45) Date of Patent: Nov. 30, 2004

(54) DETECTING A DEAD GATEWAY FOR SUBSEQUENT NON-TCP TRANSMISSION BY SENDING A FIRST TCP PACKET AND DELETING AN ARP ENTRY ASSOCIATED WITH THE GATEWAY

(75) Inventors: Deanna Lynn Quigg Brown, Pflugerville, TX (US); Vinit Jain, Austin, TX (US); Satya Prakesh Sharma, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 09/661,275

(22) Filed: Sep. 14, 2000

(51) Int. Cl.[7] .............................................. G06F 15/173
(52) U.S. Cl. ........................ 709/239; 709/240; 709/242; 709/249
(58) Field of Search ................................ 709/239, 240, 709/242, 249

(56) References Cited

U.S. PATENT DOCUMENTS

| | | | | |
|---|---|---|---|---|
| 5,949,753 A | * | 9/1999 | Alexander et al. | 370/216 |
| 6,415,329 B1 | * | 7/2002 | Gelman et al. | 709/245 |
| 6,631,137 B1 | * | 10/2003 | Lorrain et al. | 370/401 |
| 6,654,359 B1 | * | 11/2003 | La Porta et al. | 370/328 |

OTHER PUBLICATIONS

Braden (Editor) "RFC 1122", Oct. 1989.*

* cited by examiner

Primary Examiner—Wen-Tai Lin

(74) Attorney, Agent, or Firm—Robert A. Voigt, Jr.; Winstead Sechrest & Minick P.C.; Diana L. Roberts-Gerhardt

(57) ABSTRACT

A method, computer program product and system for detecting a first-hop dead gateway. In one embodiment, a method comprises the step of sending a TCP packet of data from an application of a sender host to a receiver host through a first gateway, where the first gateway is a first-hop away from the sender host. The method further comprises the step of TCP failing to receive an acknowledgment of received data from the receiver host. The method further comprises the step of deleting an ARP entry associated with the first gateway in the sender host. The method further comprises the step of establishing a new communication using the first gateway by the application or new application of the sender host. The method further comprises the step of sending an ARP request to the first gateway by the sender host. If the sender host receives a response from the first gateway, then the method further comprises the step of sending a TCP or non-TCP packet of data using the first gateway if the new communication was a TCP or non-TCP communication, respectively. If the sender host does not receive a response from the first gateway, then the method further comprises the step of selecting an alternative path through an alternative first-hop gateway in the routing table of the sender host. The application or new application of the sender host then sends the TCP or non-TCP packet of data using the alternative gateway if the new communication was a TCP or non-TCP communication, respectively.

18 Claims, 4 Drawing Sheets

US 6,826,623 B1

DETECTING A DEAD GATEWAY FOR SUBSEQUENT NON-TCP TRANSMISSION BY SENDING A FIRST TCP PACKET AND DELETING AN ARP ENTRY ASSOCIATED WITH THE GATEWAY

TECHNICAL FIELD

The present invention relates to the field of digital packet telecommunications, and more particularly to a TCP/IP host configured to detect a dead gateway.

BACKGROUND INFORMATION

Digital packets of information may be communicated between an organization's internal network and the public Internet. The Internet is a collection of networks, including Arpanet, NSFnet, regional networks such as NY sernet, local networks at a number of university and research institutions, and a number of military networks. Many organizations use Internet gateways, implemented by computer workstations executing software, to provide a connection between the internal network and the Internet. These a Internet gateways can include firewall protection for the internal network in addition to providing connectivity between the internal network and the Internet. Where an organization uses more than one Internet gateway, each user on the organization's internal network can, for example, be assigned to a designated Internet gateway. The users of the internal network are thereby provided access to the Internet through their designated Internet gateways.

Information is typically transmitted over the Internet using Transmission Control Protocol/Internet Protocol (TCP/IP) protocol suite. FIG. 1 illustrates the constituents of the TCP/IP protocol suite 100. The base layer of the TCP/IP protocol suite is the physical layer 110, which defines the mechanical, electrical, functional and procedural standards for the physical transmission of data over communications media. The physical layer may comprise electrical, mechanical or functional standards such as whether a network is packet switching or frame-switching or whether a network is based on a Carrier Sense Multiple Access/Collision Detection (CSMA/CD).

Overlying the physical layer 110 is the data link layer 120. Data link layer 120 provides the function and protocols to transfer data, e.g., transfer data between clients of different networks, and to detect errors that may occur at the physical layer. Operating modes at the data link layer 120 comprise such standard network topologies as IEEE 802.3 Ethernet, IEEE 802.5 Token Ring, ITU X.25, or serial (SLIP) protocols.

Network layer protocols 130 overlay the data link layer 120 and provide the means for establishing connections between networks. The standards of network layer protocols 130 provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) for a particular host. The Routing Information Protocol (RIP) is a dynamic routing protocol for passing routing information between hosts on networks. The Internet Control Message Protocol ICMP is an internal protocol for passing control messages between hosts on various networks. ICMP messages provide feedback about events in the network environment or can help determine if a path exists to a particular host in the network environment. The latter is commonly referred to as a "ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer 140 provides end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The application layer 150 provides a list of network applications and utilities, a few of which are illustrated in FIG. 1. For example, File Transfer Protocol (FTP) is a standard TCP/IP protocol for transferring files from one computer to another. FTP clients establish sessions through TCP connections with FTP servers in order to obtain files. Telnet is a standard TCP/IP protocol for remote terminal connection. The Hypertext Transfer Protocol (HTTP) facilitates the transfer of data objects across networks via a system of uniform resource indicators (URL). The Simple Network Management Protocol (SNMP) is a standard for managing TCP/IP networks. A Remote Procedure Call (RPC) is a programming interface which enables programs to invoke remote functions on server machines.

Internet gateways generally use routing protocols, e.g., Open Shortest Path First (OSPF), to adjust to changes in the network. That is, routing of the digital packets of information may continue despite the fact that some routers are inoperative. However, Internet hosts generally do not participate in routing protocols. If a host's first-hop gateway, i.e., first gateway to the Internet host, becomes inoperative, the host will not adjust and will continue to transmit digital packets of information through a gateway that is inoperative. Hence, the host is effectively transmitting digital packets of information down a "black hole." For this reason, RFC1122, the document which governs the routing of digital packets of information across the Internet states:

"The IP layer must be able to detect the failure of a 'next-hop' gateway that is listed in its route cache and to choose an alternative gateway."

One prior art solution to the host continuing to transmit digital packets of information to the dead gateway is to simply try another route if the TCP connection is failing. Since TCP provides feedback to a host if the transmission is failing, the host may be able to select another route through a different router or gateway to send the TCP traffic. However, non-TCP traffic involves protocols that do not provide feedback to a host if the transmission is failing. Since address resolution protocol (ARP) entries which obtain a data link layer address from the corresponding network layer address (the address that IP uses) in the host are cached for a certain duration, e.g., twenty minutes, non-TCP traffic will fail for as long as the ARP entry is cached despite the fact that there was an alternative gateway. That is, non-TCP traffic will continue to be transmitted to the first-hop gateway, i.e., gateway that is one hop from the host sending the data, that is inoperative.

It would therefore be desirable to allow a host to detect a first-hop dead gateway, i.e., gateway that is inoperative, and be able to send non-TCP data through an alternative route upon a subsequent non-TCP communication. It would further be desirable to allow the host to mark the first-hop dead gateway to a lower priority if it remains inoperative upon a subsequent new communication.

SUMMARY

The problems outlined above may at least in part be solved in some embodiments by an application of a sender host sending a TCP packet of data through a first gateway to a receiver host. The first gateway is a first-hop away from the sender host. If TCP fails to receive an acknowledgment of received data from the receiver host, the ARP entry associated with the first-hop gateway is deleted in the sender host. When the application or a new application of the sender host establishes a new communication with a route through the gateway whose ARP entry was deleted, an ARP request is sent to that gateway by the sender host. If the sender host receives a response from the gateway whose ARP entry was previously deleted, then that gateway is operative. A TCP or non-TCP packet of data may then be sent by the application or new application of the sender host to the receiver host through the first-hop gateway whose ARP entry was previously deleted if the new communication established was TCP or non-TCP, respectively. If the sender host does not receive a response from the gateway whose ARP entry was previously deleted, then that gateway is inoperative, i.e., dead. The sender host then selects an alternative path through an alternative first-hop gateway in a routing table in the sender host. A TCP or non-TCP packet of data may then be sent to the receiver host by the application or new application of the sender host through the alternative first-hop gateway if the new communication was TCP or non-TCP, respectively.

In one embodiment, a method for detecting a first-hop dead gateway comprises the step of sending a TCP packet of data from an application of a sender host to a receiver host through a first gateway, where the first gateway is a first-hop away from the sender host. The method further comprises the step of TCP failing to receive an acknowledgment of received data from the receiver host. The method further comprises the step of deleting an ARP entry associated with the first gateway in the sender host. The method further comprises the step of selecting an alternative path to send the TCP packet of data from the sender host to the receiver host through a second gateway in a routing table in the sender host, where the second gateway is a first-hop away from the sender host. The method further comprises the step of establishing a new communication using the first gateway by the application or new application of the sender host. The method further comprises the step of sending an ARP request to the first gateway by the sender host. If the sender host receives a response from the first gateway, then the method further comprises the step of sending a TCP or non-TCP packet of data using the first gateway if the new communication was a TCP or non-TCP communication, respectively. If the sender host does not receive a response from the first gateway, then the method further comprises the step of selecting an alternative path through an alternative first-hop gateway in the routing table of the sender host. The application or new application of the sender host then sends the TCP or non-TCP packet of data using the alternative gateway if the new communication was a TCP or non-TCP communication, respectively.

In another embodiment of the present invention, if the sender host does not receive a response from the first gateway, i.e., gateway whose ARP entry was deleted, then all routes using that gateway are marked to a lower priority level in the routing table in the sender host. In another embodiment of the present invention, the routes through the gateway that were marked to a lower priority level may return to their original priority level upon a duration of time, e.g., five minutes.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for detecting a first-hop dead gateway. In one embodiment of the present invention, an application of a sender host sends a TCP packet of data through a first gateway to a receiver host. The first gateway is a first-hop away from the sender host. If TCP fails to receive an acknowledgment of received data from the receiver host, the ARP entry associated with the first-hop gateway is deleted in the sender host. When the application or new application of the sender host establishes a new communication with a route through the gateway whose ARP entry was deleted, an ARP request is sent to that gateway by the sender host. If the sender host receives a response from the gateway whose ARP entry was previously deleted, then that gateway is operative. A TCP or non-TCP packet of data may then be sent by the application or new application of the sender host to the receiver host through the first-hop gateway whose ARP entry was previously deleted if the new communication established was TCP or non-TCP, respectively. If the sender host does not receive a response from the gateway whose ARP entry was previously deleted, then that gateway is inoperative, i.e., dead. The sender host then selects an alternative path through an alternative first-hop gateway in a routing table in the sender host. A TCP or non-TCP packet of data may then be sent to the receiver host by the application or new application of the sender host through the alternative first-hop gateway if the new communication was TCP or non-TCP, respectively. In another embodiment of the present invention, all routes using the dead gateway are marked to a lower priority level in the routing table in the sender host.

Figure 2:
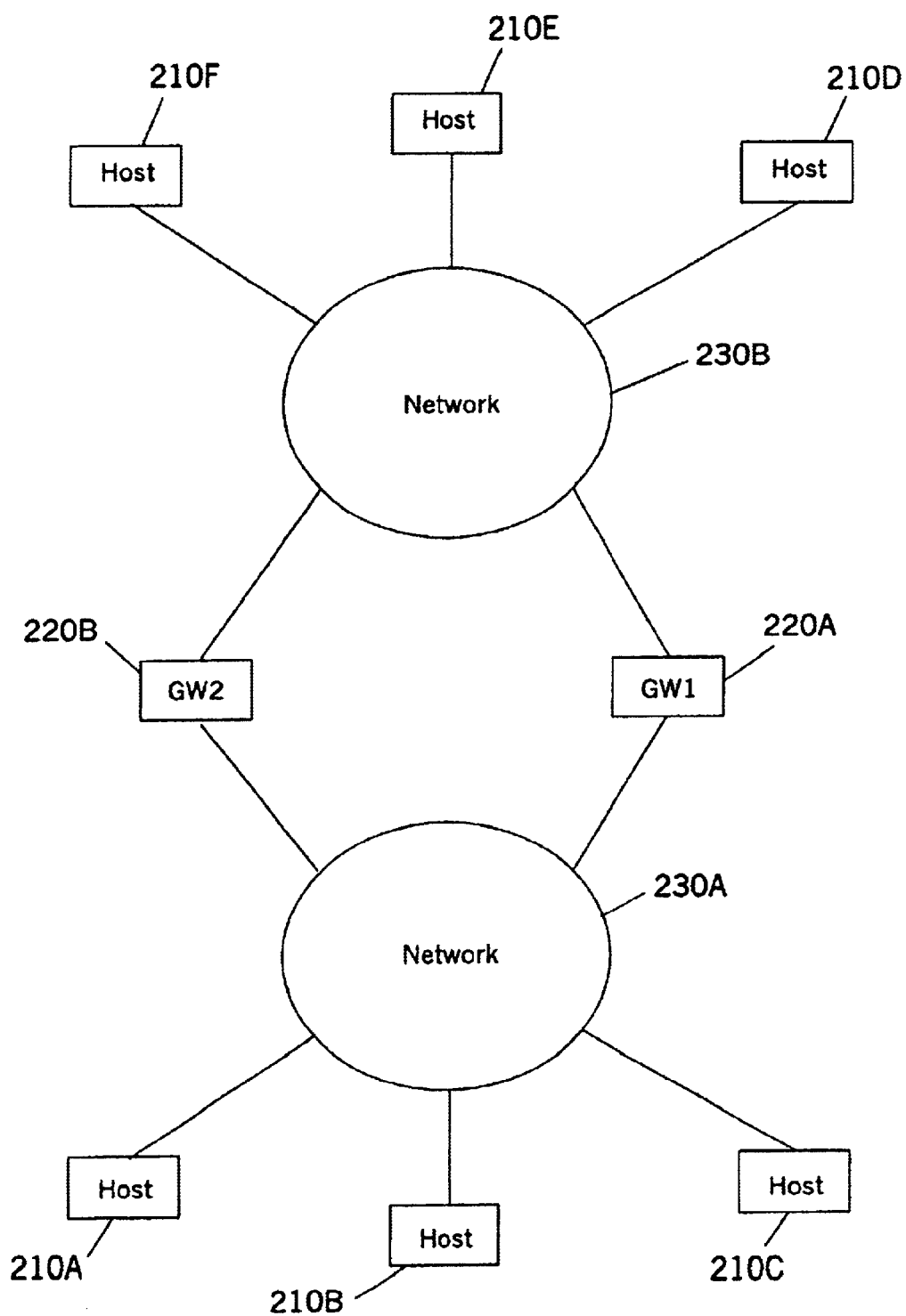
FIG. 2 illustrates transferring digital packets of information between a host on one network to a host on another network/Internet.

FIG. 2—Embodiment of a Network Connected to Another Network Through a Plurality of Gateways FIG. 2 illustrates an embodiment of the present invention where network 230A is connected to another network 230B, e.g., Internet, through gateways 220A–B. A plurality of hosts 210A–C is coupled to network 230A. A plurality of hosts 210D–F is coupled to network 230B. Hosts 210A–F may collectively or individually be referred to as hosts 210 or host 210, respectfully. Gateways 220A–B may collectively or individually be referred to as gateways 220 or gateway 220, respectfully. Networks 230A–B may collectively or individually be referred to as networks 230 or network 230, respectfully. It is noted that any number of hosts 210 may be coupled to networks 230. It is further noted that one of the networks 230 may represent the Internet which is a collection of networks.

Figure 1:
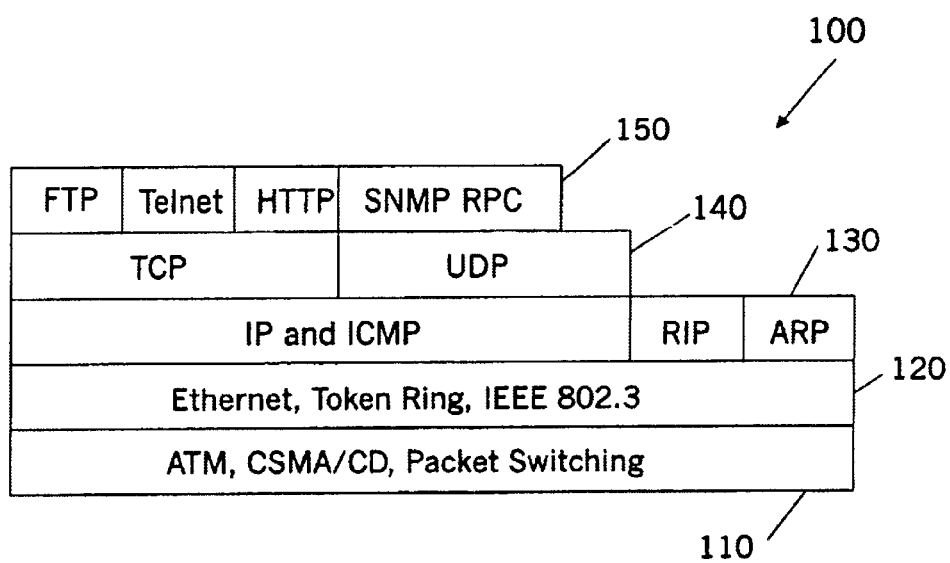
FIG. 1 depicts a relationship diagram of the layers of the TCP/IP protocol suite.

Referring to FIG. 1, each of the plurality of hosts 210A–C of network 230A is configured to send a packet a data, e.g., TCP and non-TCP data, to any of the plurality of hosts of network 230B through one of the plurality of gateways 220A–B. Each of the plurality of hosts 210D–F of network 230B is configured to send a packet a data, e.g., TCP and non-TCP data, to any of the plurality of hosts of network 230A through one of the plurality of gateways 220A–B. For example, an application running on host 210A may send a TCP or non-TCP packet of data to host 210D though gateway 220A. As stated in the Background Information section, when a first-hop gateway, i.e., gateway that is one hop from the host sending the data, becomes inoperative, the host will not adjust for non-TCP data and will continue to transmit non-TCP digital packets of information to the gateway that is inoperative. It would therefore be desirable to allow a host to detect a first-hop dead gateway, i.e., gateway that is inoperative, and be able to send non-TCP data through an alternative route upon a subsequent non-TCP communication. It would further be desirable to allow the host to mark the first-hop dead gateway to a lower priority if it remains inoperative upon a subsequent new communication. A detailed description of host 210 that is configured to detect a first-hop dead gateway and be able to send non-TCP data through an alternative route upon a subsequent non-TCP communication is described below in FIG. 3. A method of host 210 detecting a first-hop dead gateway is provided in FIG. 4.

Figure 3:
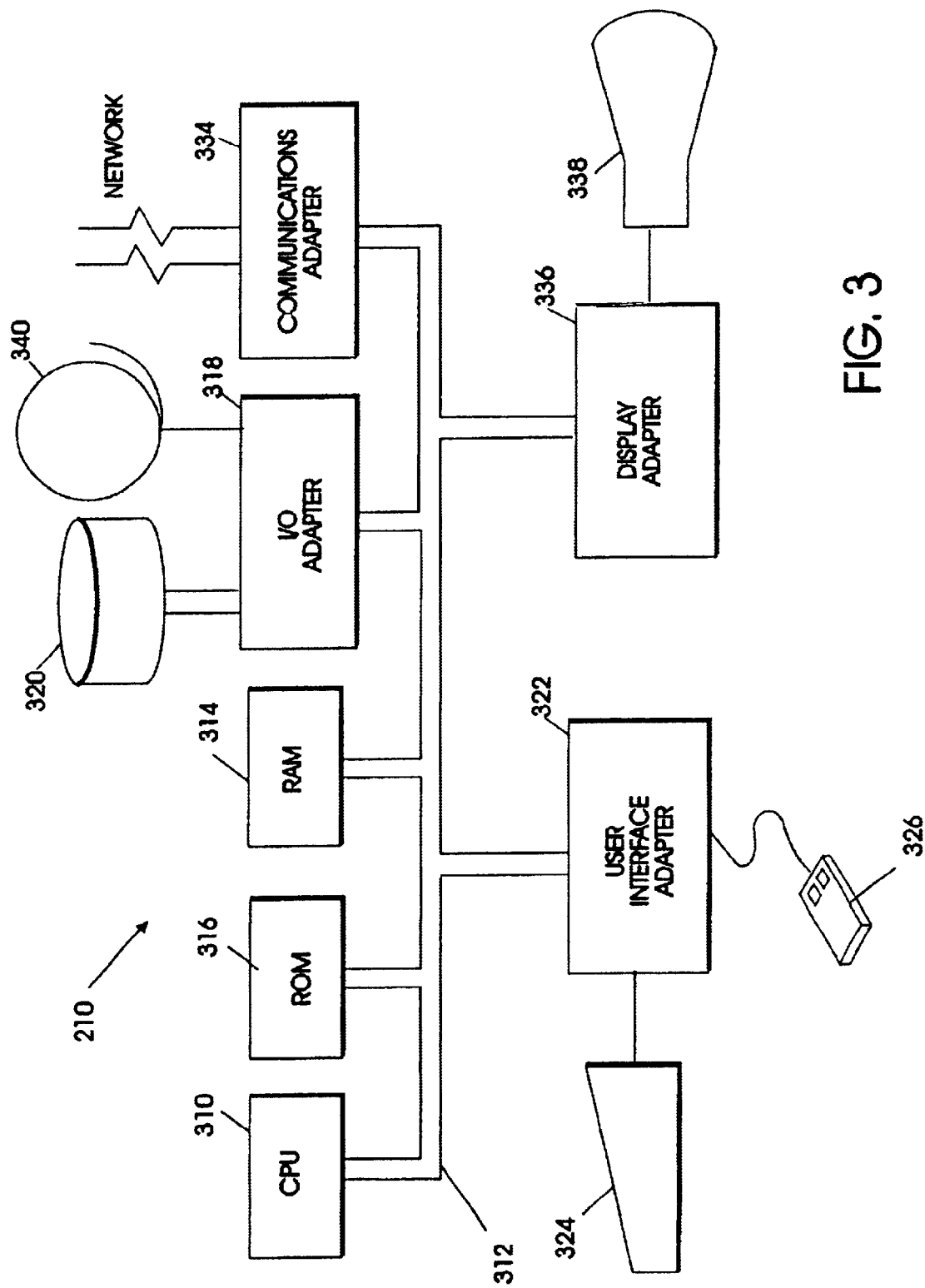
FIG. 3 illustrates a host configured in accordance with the present invention.

FIG. 3—Embodiment of a Host

FIG. 3 illustrates a typical hardware configuration of host 210 which is representative of a hardware environment for practicing the present invention. Host 210 has a central processing unit (CPU) 310, such as a conventional microprocessor, coupled to various other components by system bus 312. Read only memory (ROM) 316 is coupled to system bus 312 and includes a basic input/output system ("BIOS") that controls certain basic functions of host 210. Random access memory (RAM) 314, I/O adapter 318, and communications adapter 334 are also coupled to system bus 312. I/O adapter 318 may be a small computer system interface ("SCSI") adapter that communicates with disk units 320 and tape drives 340. Communications adapter 334 interconnects bus 312 with an outside network enabling host 210 to communicate with other such systems. Input/Output devices are also connected to system bus 312 via a user interface adapter 322 and a display adapter 336. A display monitor 338 is connected to system bus 312 by display adapter 336. In this manner, a user is capable of inputting to host 210 through a keyboard 324 or a mouse 326 and receiving output from host 210 via display 238.

Preferred implementations of the invention include implementations as a host programmed to execute the method or methods described herein, and as a computer program product. According to the host implementations, sets of instructions for executing the method or methods are resident in the random access memory 314 of one or more hosts configured generally as described above. Until required by the host, the set of instructions may be stored as a computer program product in another computer memory, for example, in disk drive 320 (which may include a removable memory such as an optical disk or floppy disk for eventual use in disk drive 320). Furthermore, the computer program product can also be stored at another host and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
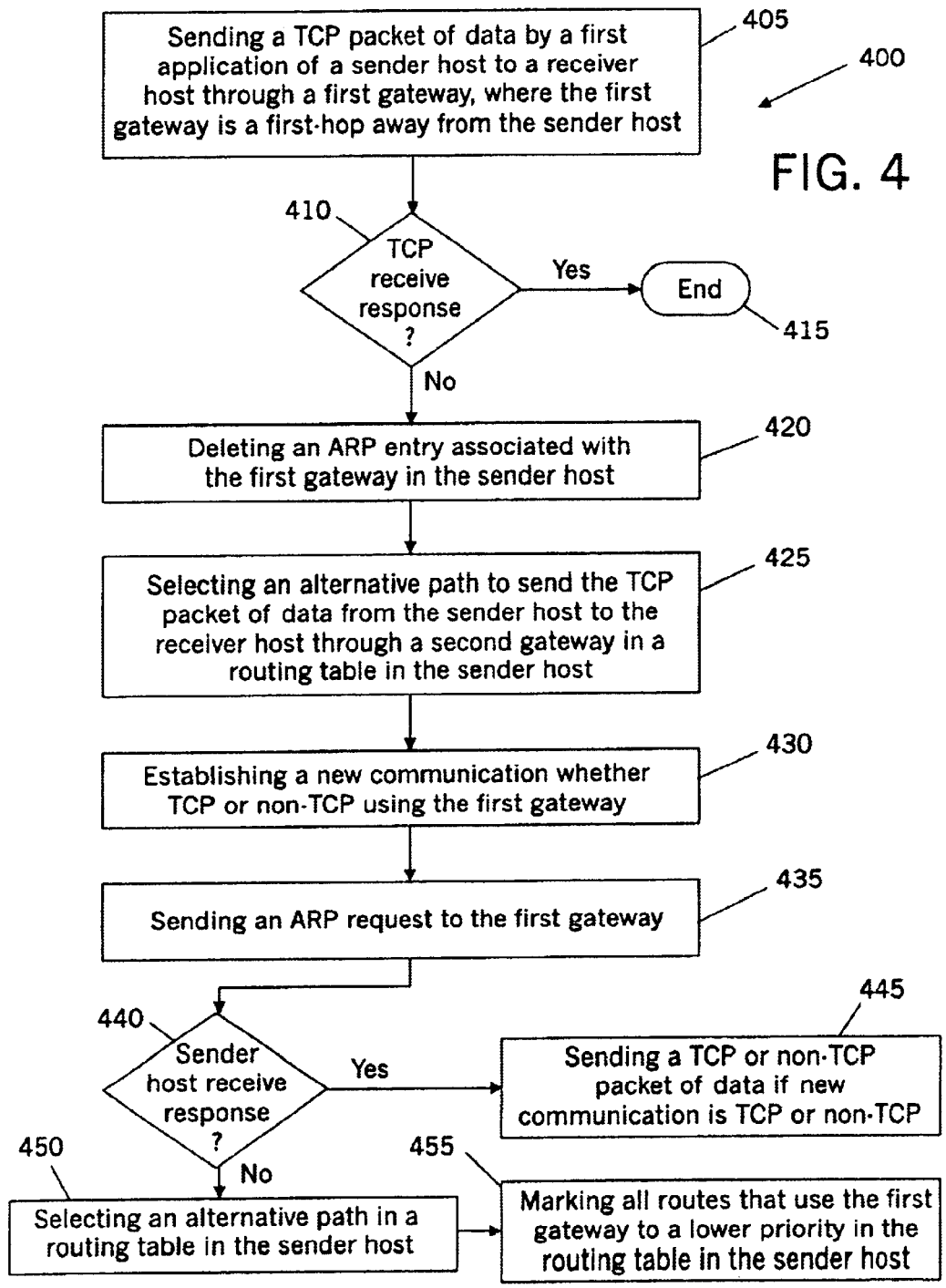
FIG. 4 is a flowchart depicting a method of a host detecting a first-hop dead gateway.

FIG. 4—Flowchart of a Method for Detecting a First-Hop Dead Gateway

FIG. 4 illustrates a flowchart of one embodiment of the present invention of a method 400 for detecting a first-hop dead gateway and sending non-TCP data through an alternative route upon a subsequent non-TCP communication. As stated above, a host of one network, e.g., 210A, is configured to send a packet of data, e.g., TCP or non-TCP data, to a host of another network, e.g., 210D, through a gateway 220 as illustrated in FIG. 2. The host that sends the packet of data is commonly referred to as a sender host. The host that receives the packet of data is commonly referred to as a receiver host.

In step 405, an application operating on the sender host, e.g., 210A, sends a TCP packet of data to the receiver host, e.g., 210D, through a gateway, e.g., 220A, in a TCP connection. A determination is then made in step 410 as to whether TCP received an acknowledgment of received data from the receiver host as described below. As stated in the Background Information section, TCP provides a connection oriented reliable mechanism for information delivery. One method employed by TCP to provide reliability is to expect each end, i.e., sender host and receiver host, to acknowledge the data received from the other end. At times though, data segments and acknowledgments may be lost. To solve this problem, TCP sets a time-out when it sends data so that the data unacknowledged is retransmitted. Hence, if TCP does not receive an acknowledgment of received data from the receiver host, then TCP resends the TCP data packet to the receiver host, e.g., 210D, through the same gateway, e.g., 220A. In one embodiment, the process may be repeated for a certain consecutive number of times or until TCP receives an acknowledgment of received data from the receiver host. If TCP receives an acknowledgment of received data from the receiver host, then method 400 ends at step 415.

If TCP did not receive an acknowledgment of received data from the receiver host, then an Address Resolution Protocol (ARP) entry associated with the first-hop gateway is deleted in the sender host in step 420. TCP may not receive an acknowledgment of received data for a number of reasons including: lost data segments or lost acknowledgments, the TCP data packet may be sent to a non-existent address, the TCP data packet may be dropped by an intermediary router or gateway, the route may be administratively prohibited, the first-hop gateway is dead, etc. Since there are other reasons for the TCP to not receive an acknowledgment of received data from the receiver other than an inoperative first-hop gateway, an ARP entry associated with the first-hop gateway is deleted in the sender host after the TCP has not received an acknowledgment of received data from the receiver host in step 420. In one embodiment, the ARP entry associated with the first-hop gateway is deleted in the sender host after the TCP has not received an acknowledgment of received data from the receiver host for a consecutive number of times. By deleting the ARP entry, the sender host may be able to determine if the first-hop gateway was indeed inoperative upon a new communication as described in steps 430 and 435.

Upon deletion of the ARP entry, an alternative route, i.e., path, is selected by the sender host to send the TCP packet of data to the receiver host through an alternative first-hop gateway in a routing table in the sender host in step 425. The alternative path is selected prior to the TCP connection timing out. For example, sender host, e.g., 210A, may now attempt to send the TCP packet of data through a different first-hop gateway, e.g., 220B, by selecting the route which includes the new gateway, e.g., 220B, in the routing table. The routing table is typically located in the network layer, specifically the IP layer of the TCP/IP protocol suite. In one embodiment, the TCP/IP protocol suite may be located in the kernal memory on the sender host.

In step 430, the application or a new application of the sender host attempts to establish a new communication, TCP or non-TCP, using the first-hop gateway whose ARP entry was deleted in step 420. When the application or new application of the sender host attempts to establish a new communication, TCP or non-TCP, using the gateway whose ARP entry was deleted in step 420, the sender host sends an ARP request to that gateway in step 435. The ARP request is used to correlate an Internet Protocol address and a Media Access Address (MAC) for that gateway. A determination is then made in step 440 as to whether the sender host receives a response from that first-hop gateway. If that first-hop gateway is operative, then the sender host receives a response from that gateway. A TCP or non-TCP packet of data may then be sent by the application or new application of the sender host to the receiver host through the first-hop gateway whose ARP entry was deleted in step 420 if the new communication was TCP or non-TCP, respectively in step 445.

If the sender host fails to receive a response from the first-hop gateway whose ARP entry was deleted, then a new route, i.e., path, is selected by the sender host in a routing table in the sender host in step 450. If the gateway whose ARP entry was deleted is inoperative, i.e., dead, then the sender host fails to receive a response from that gateway. Subsequently, an alternative route, i.e., path, is selected in the routing table in the sender host where the route is through an alternative first-hop gateway than the dead gateway. In one embodiment, an ARP request may be sent a consecutive number of times by the sender host to the gateway whose ARP entry was deleted if the sender host fails to receive a response from the gateway whose ARP entry was deleted. A TCP or non-TCP packet of data may then be sent to the receiver host by the application or new application of the sender host through the alternative first-hop gateway if the new communication was TCP or non-TCP, respectively.

If the sender host does not receive a response from the gateway whose ARP entry was deleted in step 420, then all routes using that gateway are marked to a lower priority level in the routing table in the sender host in step 455. In one embodiment, the routes through the gateway that were marked to a lower priority level may return to their original priority level upon a duration of time, e.g., five minutes.

Although the method, computer program product and system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for detecting a dead gateway comprising the steps of:

sending a first Transmission Control Protocol (TCP) packet of data from an application of a sender host to a receiver host through a first gateway;

failing to receive an acknowledgment of received data from said receiver host;

deleting an Address Resolution Protocol (ARP) entry associated with said first gateway in said sender host;

sending an ARP request to said first gateway upon deletion of said ARP entry;

wherein if a response to said ARP request is not received from said receiver host, then said first gateway is inoperative;

selecting an alternative path to send a packet of data from said sender host to said receiver host through a second gateway in a routing table in said sender host if said response to said ARP request is not received from said receiver host; and marking routes that use said first gateway to a lower priority level from an original priority level in said routing table in said sender host.

2. The method as recited in claim 1, wherein said routes that use said first gateway return to their original priority level after a duration of time.

3. The method as recited in claim 1 further comprising the step of:

sending a non-TCP packet of data to said receiver host through said second gateway using an alternative gateway.

4. The method as recited in claim 1 further comprising the step of:

sending a second TCP packet of data to said receiver host through said second gateway using an alternative gateway.

5. The method as recited in claim 1, wherein if a response to said ARP request is received from said receiver host, then said first gateway is operative.

6. The method as recited in claim 1 further comprising the step of:

sending one of a TCP and a non-TCP packet of data through said first gateway.

7. A computer program product embodied in a machine readable medium for detecting a dead gateway comprising the programming steps of:

sending a Transmission Control Protocol (TCP) packet of data from an application of a sender host to a receiver host through a first gateway;

failing to receive an acknowledgment of received data from said receiver host;

deleting an Address Resolution Protocol (ARP) entry associated with said first gateway in said sender host;

sending an ARP request to said first gateway upon deletion of said ARP entry;

wherein if a response to said ARP request is not received from said receiver host, then said first gateway is inoperative;

selecting an alternative path to send a packet of data from said sender host to said receiver host through a second gateway in a routing table in said sender host if said response to said ARP request is not received from said receiver host; and marking routes that use said first gateway to a lower priority level from an original priority level in said routing table in said sender host.

8. The computer program product as recited in claim 7, wherein said routes that use said first gateway return to their original priority level after a duration of time.

9. The computer program product as recited in claim 7 further comprising the programming step of:

sending a non-TCP packet of data to said receiver host through said second gateway using an alternative gateway.

10. The computer program product as recited in claim 7 further comprising the programming step of:

sending a second TCP packet of data to said receiver host through said second gateway using an alternative gateway.

11. The computer program product as recited in claim 7, wherein if a response to said ARP request is received from said receiver host, then said first gateway is operative.

12. The computer program product as recited in claim 11 further comprising the programming step of:

sending one of a TCP and a non-TCP packet of data through said first gateway.

13. A system, comprising:

a processor; and a memory unit coupled to said processor, wherein said memory unit is operable for storing a computer program for detecting a dead gateway;

wherein said processor, responsive to said computer program, comprises:

circuitry for sending a Transmission Control Protocol (TCP) packet of data from an application of a sender host to a receiver host through a first gateway;

circuitry for failing to receive an acknowledgment of received data from said receiver host;

circuitry for deleting an Address Resolution Protocol (ARP) entry associated with said first gateway in said sender host;

circuitry for sending an ARP request to said first gateway upon deletion of said ARP entry;

wherein if a response to said ARP request is not received from said receiver host, then said first gateway is inoperative;

circuitry for selecting an alternative path to send a packet of data from said sender host to said receiver host through a second gateway in a routing table in said sender host if said response to said ARP request is not received from said receiver host; and circuitry for marking routes that use said first gateway to a lower priority level from an original priority level in said routing table in said sender host.

14. The system as recited in claim 13, wherein said routes that use said first gateway return to their original priority level after a duration of time.

15. The system as recited in claim 13, wherein said processor further comprises:

circuitry for sending a non-TCP packet of data to said receiver host through said second gateway using an alternative gateway.

16. The system as recited in claim 13, wherein said processor further comprises:

circuitry for sending a second TCP packet of data to said receiver host through said second gateway using an alternative gateway.

17. The system as recited in claim 13, wherein if a response to said ARP request is received from said receiver host, then said first gateway is operative.

18. The system as recited in claim 17, wherein said processor further comprises:

circuitry for sending one of a TCP and a non-TCP packet of data through said first gateway.

* * * * *